United States Patent
Thompson et al.

(10) Patent No.: US 6,297,185 B1
(45) Date of Patent: Oct. 2, 2001

(54) CATALYST

(75) Inventors: Levi T. Thompson, Northville; Michael Wixom; David Tarnowski, both of Ann Arbor, all of MI (US); Cong Pu, Middleton, MA (US)

(73) Assignee: T/J Technologies, Inc., Ann Arbor, MI (US)

(*) Notice: Subject to any disclaimer, the term of this patent is extended or adjusted under 35 U.S.C. 154(b) by 0 days.

(21) Appl. No.: 09/253,965

(22) Filed: Feb. 22, 1999

Related U.S. Application Data

(60) Provisional application No. 60/075,541, filed on Feb. 23, 1998.

(51) Int. Cl.$^7$ .............. H01M 4/88; H01M 4/90; H01M 4/86; B01J 27/22; B01J 21/08
(52) U.S. Cl. .......... 502/101; 502/177; 502/240; 502/313; 502/325; 502/330; 502/527.12; 502/527.15; 429/40; 429/44; 252/514
(58) Field of Search .............. 502/101, 177, 502/240, 325, 313, 330, 527.12, 527.15; 429/40, 44; 501/87; 252/514

(56) References Cited

U.S. PATENT DOCUMENTS

| | | | |
|---|---|---|---|
| 4,186,110 | * 1/1980 | Jalan et al. | 502/101 |
| 4,192,907 | * 3/1980 | Jalan et al. | 429/40 |
| 4,422,917 | 12/1983 | Hayfield | 204/196 |
| 4,467,050 | * 8/1984 | Patel et al. | 502/330 |
| 4,677,092 | 6/1987 | Luczak et al. | 502/185 |
| 4,868,841 | 9/1989 | Affleck et al. | 372/59 |
| 4,992,407 | 2/1991 | Chakraborty et al. | 502/327 |
| 5,024,905 | 6/1991 | Itoh et al. | 429/44 |
| 5,183,713 | 2/1993 | Kunz et al. | 429/44 |
| 5,385,874 | 1/1995 | Renlund et al. | 501/103 |
| 5,431,012 | 7/1995 | Narula et al. | 60/276 |
| 5,559,065 | 9/1996 | Lauth et al. | 502/5 |
| 5,597,771 | 1/1997 | Hu et al. | 502/304 |
| 5,680,292 | 10/1997 | Thompson, Jr. et al. | 361/528 |
| 5,691,263 | 11/1997 | Park et al. | 502/66 |
| 5,705,265 | 1/1998 | Clough et al. | 428/307 |
| 5,759,944 | * 6/1998 | Buchanan et al. | 502/185 |
| 5,766,789 | * 6/1998 | James et al. | 429/44 |
| 5,861,222 | * 1/1999 | Fischer et al. | 429/42 |
| 5,879,827 | * 3/1999 | Debe et al. | 429/40 |
| 5,879,828 | * 3/1999 | Debe et al. | 429/41 |

FOREIGN PATENT DOCUMENTS

WO 92/16027    9/1992 (WO) .............. 4/88

OTHER PUBLICATIONS

K. Y. Chen, P.K. Shen, and A.C.C. Tseugn, "Anodic Oxidation of Impure H on Teflon–Bonded Pt–Ru/Wo /C Electrodes," J. Electrochem. Soc., vol. 142, No. 10 (Oct. 1995).

P.K. Shen and A.C.C. Tseugn, "Anodic Oxidation of Methanol on Pt/WO in Acidic Media," J. Electrochem Soc., vol. 141, No. 11 (Nov. 1994).

K.Y. Chen and A.C.C. Tseung, "Effect of Nafion Dispersion on the Stability of Pt/WO Electrodes," J. Electrochem. Soc., vol. 143, No. 9 (Sep. 1996).

* cited by examiner

*Primary Examiner*—Anthony Green
*Assistant Examiner*—Patricia L. Hailey
(74) *Attorney, Agent, or Firm*—Gifford, Krass, Groh, Sprinkle, Anderson & Citkowski, P.C.

(57) ABSTRACT

A catalyst comprises an electrically conductive ceramic substrate having at least one noble metal supported thereupon. The substrate may be a transition metal based ceramic such as a carbide, nitride, boride, or silicide of a transition metal, and the noble metal may comprise a mixture of noble metals. The substrate may comprise a high surface area ceramic. Also disclosed are fuel cells incorporating the catalysts.

14 Claims, 3 Drawing Sheets

CATALYST

RELATED APPLICATION

This patent application claims priority of provisional patent application 60/075,541 filed Feb. 23, 1998 and entitled "Catalyst."

FIELD OF THE INVENTION

This invention relates generally to catalysts. More specifically, the invention relates to catalysts of the type comprising at least one noble metal supported on a body of ceramic. Most specifically, the invention relates to catalysts comprised of at least one noble metal supported on an electrically conductive ceramic.

BACKGROUND OF THE INVENTION

Catalysts are used in a variety of industries and processes to control the rates and/or pathways of chemical reactions. In some instances, catalysts are used to control electrochemical reactions, and such catalysts are referred to as electrocatalysts. The catalyst materials of the present invention may be used in electrochemical and nonelectrochemical processes; however, their high electrical conductivity, stability and resistance to poisoning makes them very useful in electrochemical processes, as for example in fuel cells.

Catalysts frequently are used in harsh environments, and should be chemically stable so as to maintain their reactivity. In those instances where catalysts are used in electrochemical processes, they should also have good electrical conductivity. Noble metals are frequently employed as catalysts, and as generally understood, such metals include platinum, palladium, osmium, iridium, gold, ruthenium and rhodium. In general, the noble metals have good electrical conductivity and are relatively inert; however, such materials are very expensive; consequently, they are often disposed on a support member. The support member should be chemically stable in harsh environments, and it should have good electrical conductivity in those instances where the catalyst is being used electrochemically.

In many instances, noble metal catalysts are supported on carbon. Carbon is fairly inert and low in cost; but, the electrical conductivity of carbon is not sufficiently high for many purposes. In addition, carbon does not have good mechanical integrity, and is reactive under certain chemical conditions, particularly highly oxidizing conditions. Carbon supported catalysts are known in the prior art, for example as shown in U.S. Pat. Nos. 5,183,713; 5,024,905 and 4,677,092, and as disclosed therein, such catalysts have been used as electrodes in fuel cells.

In some instances, catalysts are supported on ceramic materials; however, ceramics are generally of very low electrical conductivity, which limits the use of the catalysts. PCT publication WO 92/16027 shows noble metal catalysts supported on tungsten oxide. U.S. Pat. No. 4,868,841 shows a catalyst body used in carbon dioxide lasers, and comprised of a noble metal catalyst which is supported on an electrically conductive material such as silicon carbon or tin oxide. U.S. Pat. No. 5,705,265 shows catalysts comprised of a coating of tin oxide supported on a non-conductive substrate, and further including a noble metal in the coating. These supports have fairly high electrical resistivities, and are used as resistive heating elements for raising the catalyst to a desired working temperature. The disclosed materials are not electrocatalysts, and in general, the electrical conductivity of the disclosed supports is too low to allow these materials to be used as catalysts in electrochemical devices such as fuel cells.

In some instances, fuel cells are operated on hydrogen which is produced by the reformation of hydrocarbon on alcohol fuels; and such hydrogen is often contaminated with CO, which has been found to be a poison for many prior art catalysts. In other instances, fuel cells are operated on methanol, and CO poisoning is a problem in methanol cells also. Reformed fuels and methanol are good sources of energy for fuels cells, and there is thus a significance interest in fuel cell catalysts which are CO tolerant.

There is thus a need for a catalytic material which is stable under a wide range of operating conditions, resistant to CO poisoning, and which has good electrical conductivity and sufficient mechanical integrity to allow it to be used in applications such as fuel cells. In addition, the material should be relatively easy to fabricate and low in cost. As will be explained in further detail hereinbelow, the present invention provides a catalyst which is low in cost, stable and has good electrical conductivity.

BRIEF DESCRIPTION OF THE INVENTION

There is disclosed herein a catalyst comprised of a support body, which is a transition metal based, electrically conductive ceramic, and further includes at least one noble metal supported on the support body. In particular embodiments, the transition metal based ceramic comprises a compound of at least one transition metal, the compound being selected from the group consisting of carbides, nitrides, borides, silicides and combinations thereof. In particular embodiments, the ceramic may further include an oxide, oxycarbide or oxynitride therein. The support member may comprise a high surface area body having a surface area of at least 10 $m^2/g$, and in particular embodiments at least 40 $m^2/g$. The noble metal may comprise a single metal, or an alloy of metals, and one particularly preferred alloy comprises an alloy of platinum and ruthenium. Another preferred alloy comprises platinum and molybdenum. The electrical resistivity of the transition metal based ceramic is, in some embodiments, in the range of $10^{-6}$ to $10^{-3}$ ohm-cm. In specifically preferred embodiments, the electrical resistivity of the ceramic is in the range of $10^{-6}$ to 1 ohm-cm.

Also disclosed herein is a fuel cell in which at least one electrode thereof includes an electrocatalyst comprised of a support body of an electrically conductive ceramic having at least one noble metal supported thereon.

DETAILED DESCRIPTION OF THE INVENTION

Figure 1:
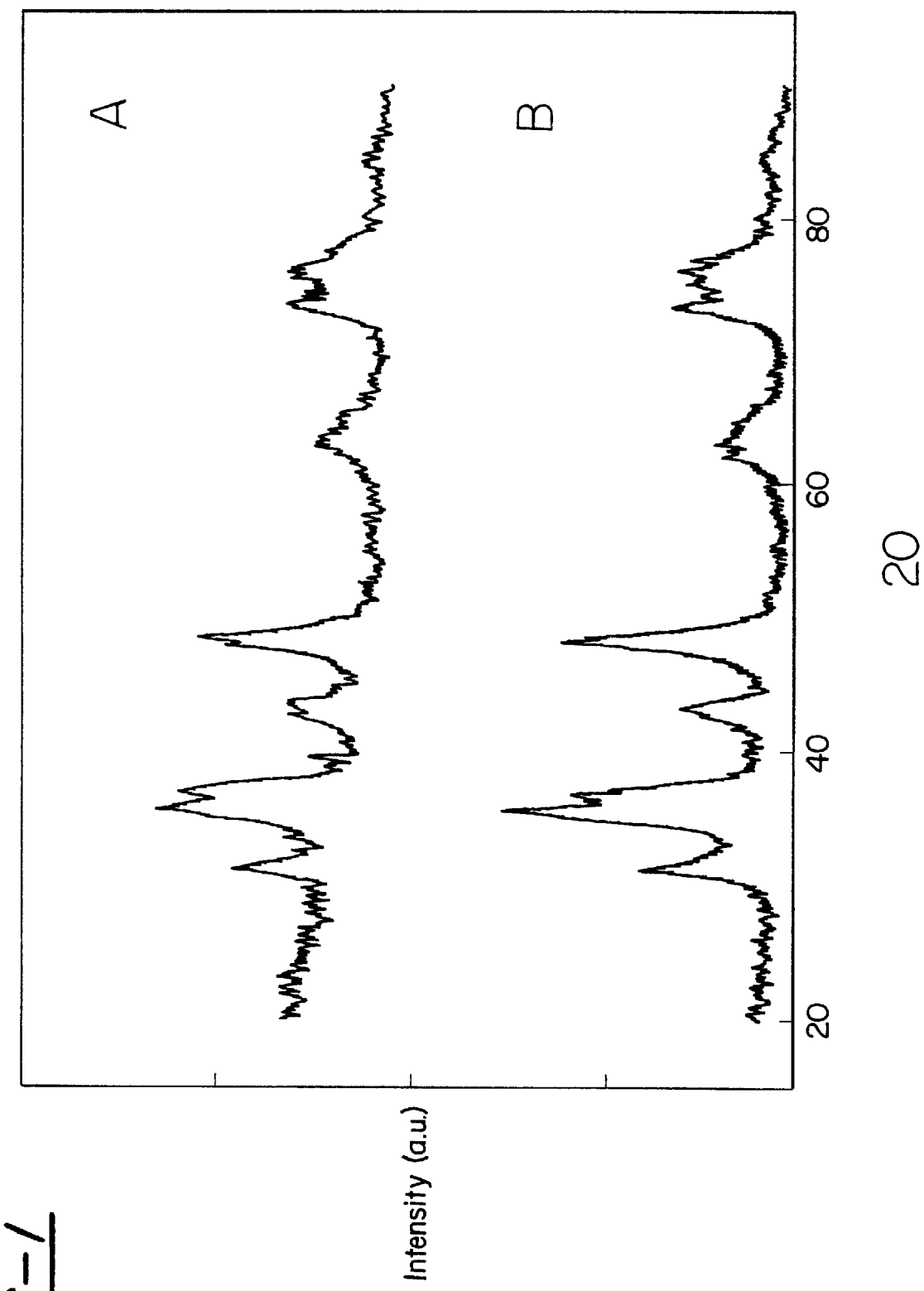
FIG. 1 is a set of x-ray diffraction spectra for a catalyst of the present material prepared in accord with Example 3 and for an electrically conductive ceramic support material used in the present invention.

The catalytic material of the present invention comprises at least one noble metal disposed upon an electrically conductive ceramic support. Within the context of this disclosure, electrically conductive materials shall refer to those materials having an electrical resistivity in the range of $10^{-6}$ to $10^3$ ohm-cm. Most preferably, the electrical resistivity of the supports of the present invention are in the range of $10^6$ to 1 ohm-cm, particularly in those materials where the catalyst is used as an electrocatalytic material, as for example in a fuel cell, battery or chemical reactor.

The electrically conductive ceramic of the present invention is preferably a transition metal based ceramic, and this designation refers to the fact that the ceramic material includes a compound of at least one transition metal therein. Such compounds are preferably selected from the group consisting of carbides, nitrides, borides, silicides and combinations thereof.

The transition metals used in the present invention can be any transition metal, but will most preferably comprise those transition metals from Groups III–VII of the periodic table. In particular embodiments, the transition metal is preferably selected from Groups IV–VI, and most specifically preferred transition metal compounds are based on Group V–VI elements.

The support members of the present invention may also include some portion of oxygen therein either as a metallic oxide or a metallic oxycarbide, oxyboride, oxysilicide or oxynitride. The oxygen compound comprises a minor component of the ceramic support, and as such the support is distinguished from oxide based materials such as tin oxide and alumina. Typically the oxygen component comprises less than 15 weight percent of the bulk ceramic. As will be explained in greater detail hereinbelow, the presence of an oxygen component such as the oxide, oxycarbide, oxyboride, oxysilicide or oxynitride on the support diminishes the poisoning effects of CO poisoning on many noble metal catalysts. The oxygen component can be present throughout the bulk of the support; however, it can be disposed only on the surface of the support, and will still manifest its beneficial effects. The oxygen component may be incorporated during the fabrication of the bulk material of the support, or it may be a native oxide, oxycarbide or oxynitride formed on the surface of the support by post-fabrication treatment, as for example by exposure to the ambient atmosphere, or by exposure to more extreme oxidizing conditions, as for example treatment with high temperature or pressure gasses; or by treatment with plasmas, or oxidizing solutions such as oxygenated water, hydrogen peroxide or the like. In some instances, the oxygen compound can be formed by anodic oxidation. The oxygen component may form a thin, continuous covering on the entirety of the surface of the substrate, or may comprise isolated domains.

The ceramics used in the present invention are preferably of relatively high surface area, and typically have a surface area of at least 10 $M^2/g$, and in a preferred embodiment have a surface area of at least 40 $M^2/g$.

The ceramic support body of the present invention permits a higher loading of electrocatylitic noble metal, as compared to support bodies of the prior art. This permits the use of thinner layers of electrocatalysts in applications such as fuel cell membrane electrode assemblies; which in turn provides higher power density by avoiding fuel transport limitations in the electrocatalyst layer. The support body of the present invention also provides for a better dispersion of the noble metal which leads to its more efficient utilization. While not wishing to be bound by speculation, it is believed that another advantage of the present invention is that the oxygen sites on the electrically conductive ceramic enhance the carbon monoxide resistance of the catalyst, thereby minimizing the amount of ruthenium or other noble metal which prior art catalysts require to achieve carbon monoxide tolerance.

The present invention may be employed with any noble meal catalyst system. As is known in the art, such catalyst systems comprise one or more noble metals, which may also be used in combination with non-noble metals. One particularly preferred noble metal material comprises an alloy of platinum and ruthenium. Other particularly preferred catalyst systems comprise alloys of platinum and molybdenum; platinum and tin; and platinum, ruthenium and osmium. Other noble metal catalytic systems known and available to those of skill in the art may be similarly employed in the present invention.

In view of the disclosure and discussion presented herein, various methods for the fabrication of electrically conductive ceramic substrates, and various methods for the disposition of noble metal materials onto the substrates will be apparent to one of skill in the art, and the present invention is not limited to any specific fabrication method. The fabrication of high surface area transition metal based ceramic materials are disclosed in U.S. Pat. No. 5,680,292; U.S. Pat. No. 5,837,630 and U.S. patent application Ser. No. 08/818,337 (now U.S. Pat. No. 5,888,669), the disclosures of which are all incorporated herein by reference. In those instances where high surface area substrates are not required, other bulk fabrication techniques such as sintering, hot pressing and the like may be employed. The noble metal can be deposited onto the substrate by variety of techniques including chemical precipitation, sputtering, evaporation, plasma vapor deposition, chemical vapor deposition, photochemical decomposition and the like.

The following examples are illustrative of particular embodiments of the present invention, but are not meant to be limitations upon the practice thereof.

EXAMPLE 1

In this example, a catalyst comprising platinum supported on a high surface area tungsten carbide body was prepared. The total weight of the catalyst was approximately 20 grams, and the platinum content was approximately 10 weight percent.

Five grams of hexachloroplatinic acid was dissolved in 200 ml of methanol. The amount of chloroplatinic acid was chosen to be equivalent to 2 grams of platinum metal, and the specific amount of the chloroplatinic acid employed in a particular synthesis will depend upon the degree of its hydration. A high surface area tungsten carbide ceramic powder was prepared according to the methods disclosed in U.S. Pat. No. 5,680,292, and 18 grams of this material was added directly to the chloroplatinic acid solution. The mixture was sonicated for 10 minutes and then refluxed for 4 hours. The methanol was removed by evaporation at room temperature under vacuum to produce a dry powder comprising a platinum compound adsorbed on the support material. This powder was transferred to a horizontal pyrolysis tube of fused silica and a mixture of 10% hydrogen and 90% nitrogen was flowed through the tube. The tube was initially heated to 110° C. for 20 minutes to remove any residual moisture or solvent from the powder. The temperature of the tube was then raised to 400° C., and this elevated temperature maintained for 2 hours, during which time reduction of the chloroplatinic acid took place. Following the reduction step, the atmosphere flowing through the tube was switched to a passivating atmosphere comprised of 1% oxygen with the balance being nitrogen. The temperature of the tube was adjusted to 350° C. and maintained thereat for 30 minutes, after which the tube was allowed to cool to room temperature while the flow of the passivation atmosphere was maintained. It is believed that some oxides are formed during the passivation step.

This resulted in the production of approximately 20 grams of catalyst comprising a tungsten carbide substrate having approximately 10% platinum thereon. The particle size of the platinum was measured to be about 4 nanometers, based upon x-ray diffraction line widths.

EXAMPLE 2

In this example, 5 grams of hexachloroplatinic acid was dissolved in 100 ml of water in a 500 ml Erlenmeyer flask. This was mixed with 200 ml of 2% sodium hydroxide and the mixed solution heated to 60° C. to produce a hexahydroxoplatinate solution. About 18 grams of tungsten carbide support material, prepared in accord with the previous example, was added to the hexahydroxoplatinate solution to produce a slurry. The slurry was sonicated for 10 minutes, after which the flask was topped with a watch glass, and the slurry mixture boiled on a hot plate, with stirring, for 30 minutes. After 30 minutes, the watch glass was removed and boiling maintained until a significant amount of the water evaporated and a thick slurry was left. Drying was continued under vacuum at 60° C. to produce a dried powder which was washed three times with pure water, in a Buchner funnel, to remove any soluble materials. The resultant catalyst was redried, and comprised approximately 9% by weight of platinum, with the platinum having an average particle size of about 3 nm, as based upon x-ray diffraction line widths.

EXAMPLE 3

In this example, catalysts composed of platinum and/or platinum-ruthenium alloy particles dispersed on tungsten carbide supports were prepared by a method generally similar to that described by Watanabe et al. (Watanabe, M.; Uchida, M.; Motoo, S. J. Electroanal. Chem. 1987, 229, 395–406). 122 mg of Pt in the form of hexachloroplatinic acid solution was added to 800 mL of deionized water. 15 grams of sodium bisulfite was added to the solution, and the pH was adjusted to between 3 and 5 with drops of 10% sodium carbonate solution dropwise, with 10% sodium carbonate added simultaneously to maintain a solution pH of 3–5. When the solution was titrated with peroxide to the equivalence point (no changes in pH were observed with the addition of hydrogen peroxide), peroxide addition was ceased. 185 mg of ruthenium chloride dissolved in 50 mL of deionized water was added slowly to the solution. For pure Pt catalysts, the addition of ruthenium is omitted. An additional 15 mL of 30% hydrogen peroxide was then added slowly to the solution after reaching the equivalence point. The solution was covered to prevent evaporation and stirred for 2 hours to reduce peroxide concentrations to desired levels.

1.8 g of tungsten carbide was washed ultrasonically in deionized water and added to a 2 liter flask containing 1 liter of deionized water. The noble metal solution prepared above was added to the flask, which was then purged for at least 14 hours with hydrogen gas while under magnetic stirring.

The procedure produced approximately 2 grams of supported platinum-ruthenium alloy catalyst with platinum and ruthenium percentages of 6.2 and 3.1 percent by weight, respectively, as determined by atomic absorption spectroscopy. As described in detail below, X-ray diffraction patterns exhibited no signs of platinum-ruthenium particles, suggesting noble metal particles sizes of less than 2–3 nm.

The catalytic materials prepared by the methods of Example 3 described above were first characterized by analyzing the metallic contents using atomic absorption spectrophotometry and then by x-ray diffraction techniques. X-ray diffraction patterns of the support carbide and the Pt-Ru dispersed catalyst were compared to examine the dispersion quality as shown in FIG. 1. The diffraction peaks as indicated in the figure correspond essentially to tungsten carbides such as WC and $WC_{1-x}$. No peaks associated with $PtO_2$ or $RuO_2$ (the fine metallic particles are expected to exist as oxide forms) have been detected with significant intensities. Following the relationship (Cullity, Elements of X-ray Diffraction, Addison-Wesley, Reading, Mass. 1978) between the peak width of a diffraction peak and the average crystallite size d, $$d=0.9\lambda/(B \cos \vartheta_B)$$

where $\lambda$, B and $\vartheta$ denote x-ray wavelength, full width at the half maximum of the diffraction peak and Bragg angle, respectively, fairly well defined peaks with a peakwidth 3–5° would be observed for a Pt crystallite size nm in the same signal-to-noise spectra as in FIG. 1 since the cross-section for Pt is much larger than the support material. Hence the absence of such peak suggests that the noble metal particles are very small, i.e. less than 3 nm in diameter or they form amorphous phases. If the platinum clusters are assumed spherical, the specific surface area can be estimated based on a simple geometric model. Dispersion of clusters 3 nm in average diameter would give a specific surface area of ca. 90 $m^2$/g.

Figure 2:
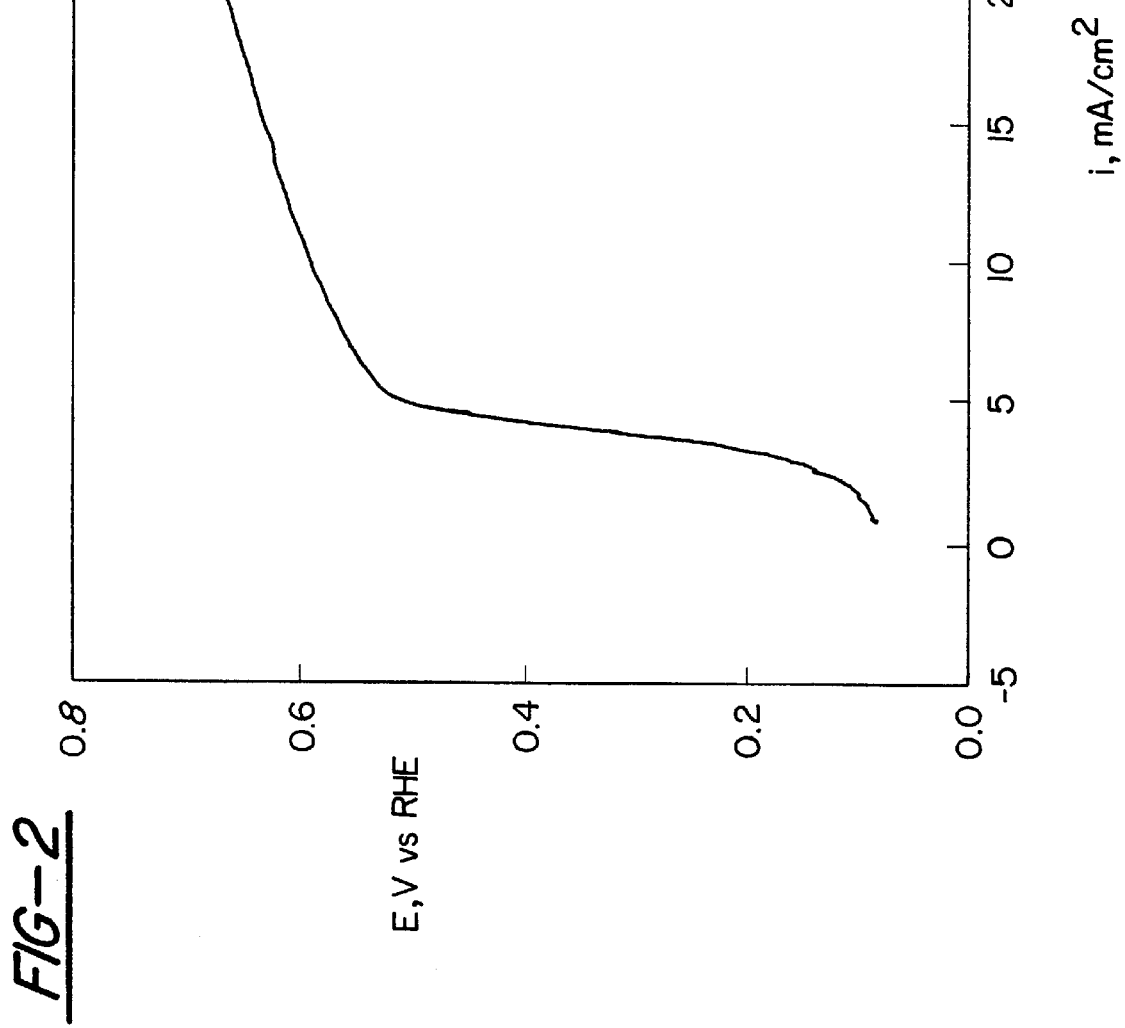
FIG. 2 is a polarization curve for a methanol fuel cell electrode of the present invention.
Figure 3:
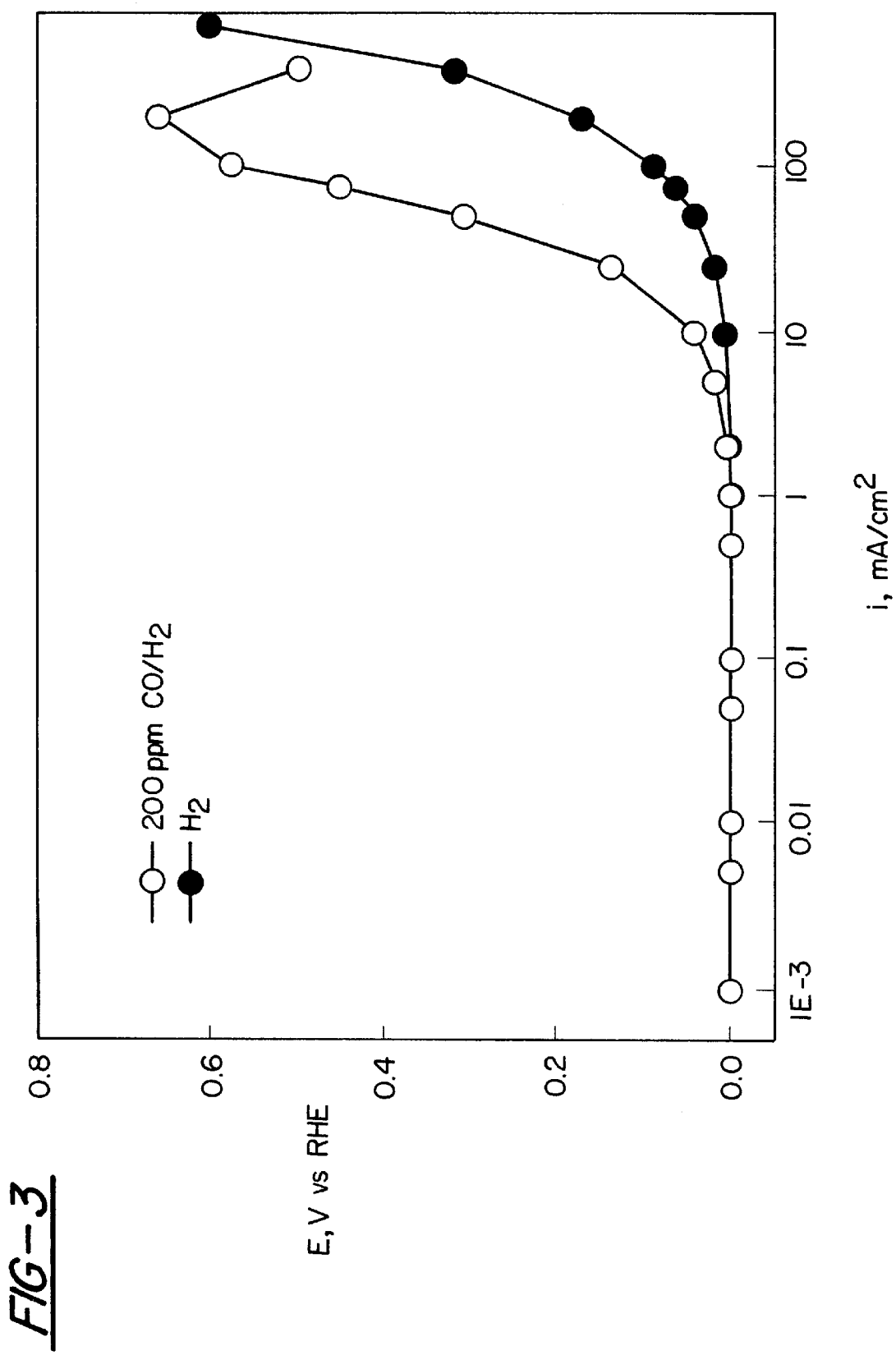
FIG. 3 is a polarization curve for a hydrogen fuel cell electrode of the present invention operating in the presence and absence of a CO contaminant.

20 mg of the catalyst was dispersed in 0.5 ml of 0.2% Nafion-isopropyl alcohol in a small vial by sonication and stirring overnight. This catalyst dispersion of 50 $\mu l$ which corresponds to 2 mg catalyst/$cm^2$ was spread onto a hydrophobic carbon layer of 1 $cm^2$. Anodic currents were measured for the gas phase reactants using a gas-fed type electrode/cell assembly in which the electrode was in contact with 0.5M sulfuric acid and the gas was supplied to the back of the electrode. Electrodes prepared in this fashion were tested for methanol oxidation at room temperature. A typical polarization curve is shown in FIG. 2. Electrodes were also tested for hydrogen oxidation at room temperatures with and without 200 ppm carbon monoxide in the hydrogen stream at 70 ml/min. The results are displayed in FIG. 3. These experiments illustrated yet other methods for fabricating the catalytic materials of the present invention, and the utility of these materials in both hydrogen and methanol fuel cells.

EXAMPLE 4

Procedures as set forth above can be implemented using support ceramics other than the tungsten carbide. Comparable results will also be achieved using carbides of other transition metals such as niobium, vanadium, and molybdenum. Similarly, nitride, boride and silicide based ceramics will also produce good catalyst materials. In some instances, mixed compounds can be employed as the conductive ceramic. For example, a ceramic having the composition $W_{0.9}Ni_{0.1}C$ has been found to produce a very good substrate for a catalyst used in fuel cells.

Other techniques can be employed for the deposition of the noble metals onto the support material. For example, in one other process, chloroplatinic acid is dissolved in water to produce a solution having a pH of approximately 2, a molar excess of sodium bisulfite (based on the molarity of platinum) is added to the solution raising the pH to approximately 3.5. In those instances where a second metal such as ruthenium is to be incorporated, a salt of the metal, such as ruthenium trichloride, is dissolved in water and added in the appropriate amounts to the platinum solution. The pH of the solution is then adjusted to approximately 5, by the addition of sodium carbonate. A 30% solution of hydrogen peroxide is then added to the solution, dropwise, to adjust the pH to between 3 and 5. Excess peroxide is to be avoided since it can decompose certain ceramic support bases; therefore, the solution is allowed to stand for several hours to permit excess peroxide to decompose, and the ceramic support material is then added to the solution to produce a slurry. The ceramic/solution slurry is stirred and hydrogen bubbled therethrough for at least 10 hours to reduce the metallic ions into free metal which precipitates onto the surface of the ceramic.

It has been found that when mixed platinum ruthenium catalysts are being employed, the platinum-ruthenium ratio for the ceramic supported catalyst of the present invention may differ from those previously employed for platinum:ruthenium supported on carbon. This may be due to differences in catalytic activities of the resultant material due to electronic and/or structural contributions induced by interactions between the noble metals and the support material. In general, the optimum Pt:Ru ratio for the catalysts of the present invention is expected to be greater than that reported for carbon supported Pt:Ru catalysts. Other noble metals may be similarly deposited onto ceramic support substrates utilizing the techniques disclosed hereinabove. Also, as previously noted, other techniques may be employed to deposit the noble metal onto the support structure.

In view of the foregoing, it will be appreciated that the present invention is directed to catalysts comprised of one or more noble metals supported on an electrically conductive ceramic substrate, which is most preferably a transition metal containing ceramic substrate. The substrates may be prepared by a number of techniques known in the prior art, and the noble metals may be likewise deposited onto the substrates by art known techniques. In view of the foregoing, many modifications and variations of the present invention will be apparent to one of skill in the art. The foregoing discussion, description and examples is meant to be illustrative of some specific embodiments of the invention, but is not a limitation upon the practice thereof. It is the following claims, including all equivalents, which define the scope of the invention.

What is claimed is:

1. A catalyst comprising:
    a support body comprised of a Group V–VI transition metal based, electrically conductive ceramic, said electrically conductive ceramic comprising: a first compound of at least one Group V–VI transition metal, said first compound being selected from the group consisting of carbides, nitrides, borides, silicides, and combinations thereof; and a second compound of at least one Group V–VI transition metal, said second compound being present in an amount greater than zero and up to 15% by weight of the electrically conductive ceramic, said second compound being selected from the group consisting of oxides, oxycarbides, oxyborides, oxysilicides, oxynitrides and combinations thereof; and
    at least one noble metal supported upon said support body.

2. A catalyst as in claim 1, wherein said second component is disposed upon at least a portion of the surface of said first compound.

3. A catalyst as in claim 1, wherein said transition metal based, electrically conductive ceramic has a surface area of at least 10 m²/g.

4. A catalyst as in claim 1, wherein said transition metal based, electrically conductive ceramic has a surface area of at least 40 m²/g.

5. A catalyst as in claim 1, wherein said noble metal is selected from the group consisting of Pt, Pd, Os, Ir, Ru, Ag, Rh, and combinations thereof.

6. A catalyst as in claim 1, wherein said noble metal comprises a mixture of platinum and ruthenium.

7. A catalyst as in claim 1, wherein said noble metal comprises a mixture of platinum and molybdenum.

8. A catalyst as in claim 1, wherein the electrical resistivity of said transition metal based, electrically conductive ceramic is in the range of $10^{-6}$ to $10^3$ ohm-cm.

9. A catalyst as in claim 1, wherein the electrical resistivity of said transition metal based, electrically conductive ceramic is in the range of $10^{-6}$ to 1 ohm-cm.

10. A fuel cell wherein at least one electrode thereof includes an electrocatalyst, said electrocatalyst comprising:
    a support body comprised of an electrically conductive Group V–VI transition metal based ceramic, said electrically conductive ceramic comprising: a first compound of at least one Group V–VI transition metal, said first component being selected from the group consisting of carbides, nitrides, borides, silicides, and combinations thereof; and a second compound of at least one Group V–VI transition metal, said second compound being present in an amount greater than zero and up to 15% by weight of the electrically conductive ceramic, said second compound being selected from the group consisting of oxides, oxycarbides, oxyborides, oxysilicides, oxynitrides and combinations thereof; and
    at least one noble metal supported upon said support body.

11. A fuel cell, as in claim 10, wherein said electrically conductive ceramic has a surface area of at least 10 m²/g.

12. A fuel cell as in claim 10, wherein the electrical resistivity of said ceramic is in the range of $10^{-6}$ to $10^3$ ohm-cm.

13. A fuel cell as in claim 10, wherein the electrical resistivity of said ceramic is in the range of $10^{-6}$ to 1 ohm-cm.

14. A catalyst comprising:
    a support body comprised of a transition metal based electrically conductive ceramic, said electrically conductive ceramic comprising: a first compound of at least one Group V–VI transition metal, said first compound being selected from the group consisting of carbides, nitrides, borides, silicides, and combinations thereof; and a second compound of at least one Group V–VI transition metal, said second compound being present in an amount greater than zero and up to 15% by weight of the electrically conductive ceramic, said second compound being selected from the group consisting of oxides, oxycarbides, oxyborides, oxysilicides, oxynitrides and combinations thereof; and
    platinum and molybdenum supported upon said support body.

* * * * *

UNITED STATES PATENT AND TRADEMARK OFFICE
CERTIFICATE OF CORRECTION

PATENT NO. : 6,297,185 B1  Page 1 of 1
DATED : October 2, 2001
INVENTOR(S) : Levi T. Thompson It is certified that error appears in the above-identified patent and that said Letters Patent is hereby corrected as shown below:

Column 1,
Line 59, replace "carbon" with -- carbide --.

Column 2,
Line 10, replace "fuels" with -- fuel --.
Line 10, replace "significance" with -- significant --.
Line 41, replace "$10^{-3}$" with -- $10^3$ --.

Column 3,
Line 3, replace "materials" with -- instances --.
Line 17, replace "most" with -- some --.
Lines 43-44, replace "compound" with --component --

Column 4,
Line 26, replace "by variety" with -- by a variety --.

Column 7,
Line 12, replace "platinum-ruthenium" with -- platinum:ruthenium --.

Signed and Sealed this

Third Day of September, 2002

Attest:

JAMES E. ROGAN
Attesting Officer  Director of the United States Patent and Trademark Office